(12) United States Patent
Hirose et al.

(10) Patent No.: US 11,340,578 B2
(45) Date of Patent: May 24, 2022

(54) MACHINE CONTROL SYSTEM, MACHINE CONTROLLER, AND VIBRATION SUPPRESSION COMMAND GENERATION METHOD

(71) Applicant: KABUSHIKI KAISHA YASKAWA DENKI, Kitakyushu (JP)

(72) Inventors: Kenichi Hirose, Kitakyushu (JP); Atsuro Tandai, Kitakyushu (JP); Yasuhiro Suzuki, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 240 days.

(21) Appl. No.: 16/794,229

(22) Filed: Feb. 19, 2020

(65) Prior Publication Data

US 2020/0333762 A1    Oct. 22, 2020

(30) Foreign Application Priority Data

Apr. 22, 2019 (JP) .............................. JP2019-081162

(51) Int. Cl.
    G05B 19/404    (2006.01)
(52) U.S. Cl.
    CPC ............... G05B 19/404 (2013.01); *G05B 2219/41408* (2013.01); *G05B 2219/41426* (2013.01); *G05B 2219/49054* (2013.01)
(58) Field of Classification Search
    CPC ........ G05B 19/404; G05B 2219/41408; G05B 2219/41426; G05B 2219/49054
    USPC .......................................... 318/623, 611, 560
    See application file for complete search history.

(56) References Cited

U.S. PATENT DOCUMENTS

| 7,462,998 B2* | 12/2008 | Akiyama ............. G05B 19/416 318/626 |
| 8,456,126 B2* | 6/2013 | Tate ..................... G05B 19/351 318/600 |
| 9,606,524 B2* | 3/2017 | Egi ....................... G05B 19/416 |
| 2005/0052149 A1 | 3/2005 | Kameyama |
| 2013/0173026 A1 | 7/2013 | Kawana et al. |
| 2020/0077552 A1 | 3/2020 | Kido |

FOREIGN PATENT DOCUMENTS

| JP | 2005-85074 | 3/2005 |
| JP | 2005-284843 | 10/2005 |
| JP | 2017-138821 | 8/2017 |
| WO | WO 2012/057235 | 5/2012 |
| WO | WO 2018/179120 | 10/2018 |

OTHER PUBLICATIONS

Japanese Office Action for corresponding JP Application No. 2019-081162, dated Jul. 22, 2020 (w/ English machine translation).

\* cited by examiner

*Primary Examiner* — David Luo
(74) *Attorney, Agent, or Firm* — Mori & Ward, LLP

(57) ABSTRACT

A machine control system includes a first movable element configured to be driven by a first motor, a second movable element configured to be driven by a second motor which is connected to the first motor so that a jerk to be generated by the first motor is applied to the second movable element, and control circuitry configured to generate a first control command to control the first motor and to generate a second control command to control the second motor according to the jerk.

17 Claims, 12 Drawing Sheets

MACHINE CONTROL SYSTEM, MACHINE CONTROLLER, AND VIBRATION SUPPRESSION COMMAND GENERATION METHOD

CROSS-REFERENCE TO RELATED APPLICATIONS

The present application claims priority under 35 U.S.C. § 119 to Japanese Patent Application No. 2019-081162, filed Apr. 22, 2019. The contents of this application are incorporated herein by reference in their entirety.

BACKGROUND OF THE INVENTION

Field of the Invention

The present invention relates to a machine control system, a machine controller, and a vibration suppression command generation method.

Discussion of the Background

For example, Japanese Patent Application Publication No. 2017-138821 describes, in order to cancel vibration overshoot that occurs during positioning control of a machine by a motor, a vibration suppression method of adding a compensation torque command corresponding to vibration having a phase opposite to the above vibration to a torque command of the motor.

On the other hand, there are many mechanical facilities provided with a plurality of coupled movable elements individually driven by a plurality of motors, and other movable elements may be vibrated by driving any one of the movable elements. On the other hand, even if the vibration suppression method of the above prior art is applied, a vibration suppression effect cannot be obtained because the cause of the vibration is the driving of the movable element on the other axis.

SUMMARY OF THE INVENTION

According to one aspect of the present invention, a machine control system includes a first movable element, a second movable element, and control circuitry. The first movable element is configured to be driven by a first motor. The second movable element is configured to be driven by a second motor which is connected to the first motor so that a jerk to be generated by the first motor is applied to the second movable element. The control circuitry is configured to generate a first control command to control the first motor and to generate a second control command to control the second motor according to the jerk.

According to another aspect of the present invention, a machine controller includes control circuitry which is configured to generate a second control command to control the second motor according to a jerk to be generated by a first motor and to be applied to the second motor.

According to further aspect of the present invention, a vibration suppression command generation method executed by an arithmetic device included in a machine controller that each individually controls a plurality of motors includes executing generation of a vibration suppression command added to a normal control command in a second control command to drive a second motor according to a jerk to be generated by a first motor and to be applied to the second motor.

DESCRIPTION OF EMBODIMENTS

Hereinafter, an embodiment will be described with reference to the drawings.

1. Overall Configuration of Machine Control System

Figure 1:
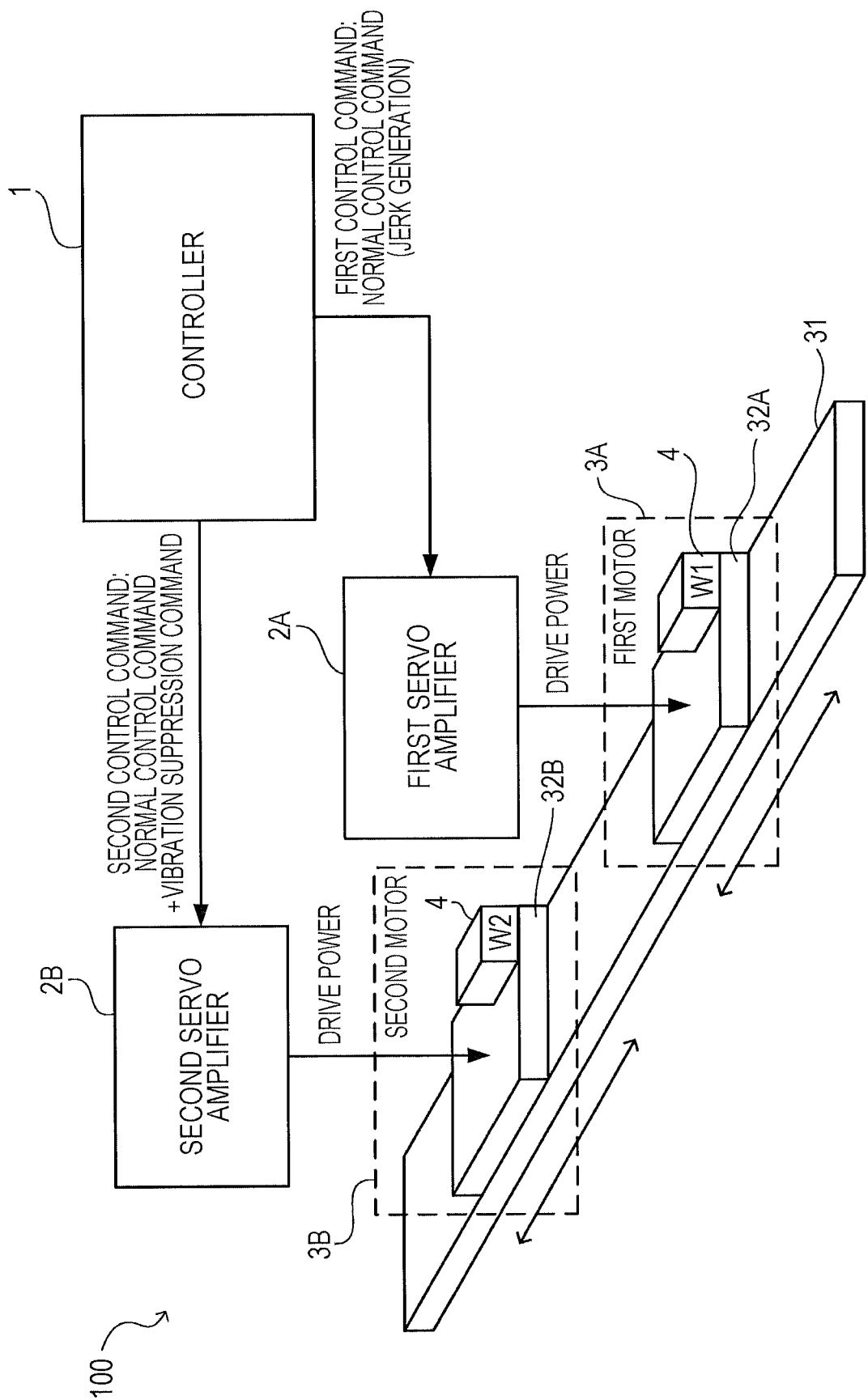
FIG. 1 is an explanatory view showing an example of an overall configuration of a machine control system according to the present embodiment.

First, by referring to FIG. 1, an example of a configuration of a machine control system according to the present embodiment will be described. FIG. 1 shows an example of an overall configuration of the machine control system according to the present embodiment. In the illustrated example of the present embodiment, a case where two linear motors are used as motors which are drive sources of a drive machine will be described.

In FIG. 1, a machine control system 100 includes a controller 1, two servo amplifiers 2A and 2B, two linear motors 3A and 3B, and a drive machine 4.

The controller 1 is constituted of a computer (see FIG. 12) including a memory such as a CPU, a ROM, or a RAM, a PLC (Programmable Logic Controller), an MC (Motion Controller), and the like, and is a host control device which controls a drive machine 4 to perform a desired temporal operation. As a specific form of this operation control function, a motion control command for instructing a desired motion operation in real time and with high accuracy to linear motors 3A and 3B, which will be described later and are power sources of the drive machine 4, is output to servo amplifiers 2A and 2B periodically at a communication control cycle described later.

The servo amplifiers 2A and 2B are constituted of a computer (see FIG. 12) including a memory such as a CPU, a ROM, or a RAM, and are motor control devices which drives and controls by supplying a drive power to the linear motors 3A and 3B described later so as to follow the motion control command input from the controller 1 in real time and with high accuracy. A control configuration of the servo amplifiers 2A and 2B will be described in detail later with reference to FIG. 3.

The linear motors 3A and 3B are direct-acting motors and generate a rectilinear thrust for driving the drive machine 4 with the drive power supplied from the servo amplifiers 2A and 2B. The linear motors 3A and 3B are configured by a combination of a rectangular flat-plate-shaped stator 31 that is long in one direction and movers 32A and 32B that can reciprocate in a longitudinal direction on the stator 31. In this example, a large number of permanent magnets (not shown) in which magnetic poles are alternately arranged in a longitudinal direction are provided on the stator 31 side, and an armature (not shown) capable of generating a rectilinear magnetic field by the drive power supplied from the servo amplifiers 2A and 2B is provided on the sides of the movers 32A and 32B. The linear motors 3A and 3B in this example are individually provided with linear scales (not particularly shown) for detecting output positions of the movers 32A and 32B.

The drive machine 4 is a mechanical structure that is connected to the movers 32A and 32B of the linear motors 3A and 3B and is mechanically driven by the drive force (thrust in this example). In the drawing, the drive machine 1 is schematically abbreviated with weights W1 and W2 fixed on the movers 32A and 32B, respectively.

In the example of the machine control system 100 of the present embodiment, the linear motors 3A and 3B, which are drive sources of the drive machine 4, individually reciprocate the two movers 32A and 32B on the common stator 31. That is, the two linear motors 3A and 3B that share the stator 31 are included. Here, a linear motor provided with one mover (the mover 32A on the right front side in the drawing in the illustrated example) is referred to as the first motor 3A, and a linear motor provided with the other mover (the mover 32B on the left back side in the drawing in the illustrated example) is referred to as the second motor 3B. The first motor 3A is independently driven and controlled by receiving a supply of a drive power from the first servo amplifier 2A, and the second motor 3B is independently driven and controlled by receiving a supply of a drive power from the second servo amplifier 2B. The controller 1 outputs appropriate control commands to the first servo amplifier 2A and the second servo amplifier 2B, respectively, and thereby can control the two linear motors 3A and 3B in a coordinated manner to drive and control the entire drive machine 4 in a predetermined sequence.

The control command transmitted and received between the controller 1 and each of the servo amplifiers 2A and 2B includes a normal control command that directly commands operation of the movers 32A and 32B of the corresponding linear motors 3A and 3B, and a vibration suppression command for suppressing vibration of the movers 32A and 32B. For example, as shown in the illustrated example, when a jerk is generated in the normal control command output from the controller 1 to the first motor 3A, the vibration suppression command based on the jerk in the first motor 3A is output together with the corresponding normal control command to the second motor 3B in which generation of vibration under the influence is predicted. Such control command transmission/reception between the controller 1 and each of the servo amplifiers 2A and 2B is performed by synchronous communication, which will be described later, in order to ensure real-time performance of motion control in the drive machine 4.

In the following description, combinations of the corresponding linear motors 3A and 3B and the servo amplifiers 2A and 2B are collectively referred to as a drive shaft control system. In the above description, the movers 32A and 32B of the linear motors 3A and 3B and a movable section of the drive machine 4 that is connected to the movers 32A and 32B and operates correspond to movable elements described in the claims. The servo amplifiers 2A and 2B correspond to motor control devices described in the claims. The controller 1 corresponds to host control devices described in the claims. The whole summarizing the controller 1 and the plurality of servo amplifiers 2A and 2B corresponds to machine control devices described in the claims. The control command output from the controller 1 toward the first servo amplifier 2A in this example corresponds to first control commands described in the claims. The control command output from the controller 1 toward the second servo amplifier 2B in this example corresponds to second control commands described in the claims.

Processing and the like in the controller 1, the first servo amplifier 2A, the second servo amplifier 2B and the like are not limited to the example of allotment of the processing, but, for example, they may be processed in a smaller number of control devices (for example, one machine control device) or in control devices furthermore segmentalized. The processing of the controller 1 (or the servo amplifiers 2A and 2B) may be implemented by a program executed by a CPU 901 (arithmetic device; see FIG. 12) described later, or a part or the whole thereof may be implemented with a dedicated integrated circuit such as ASIC or FPGA or an actual device such as another electric circuit.

2. Features of the Present Embodiment

Many general mechanical equipment including industrial machines have a configuration including a plurality of movable elements individually driven by the plurality of motors 3A and 3B as in the present embodiment. The plurality of motors 3A and 3B are individually driven and controlled by the plurality of servo amplifiers 2A and 2B, and the plurality of servo amplifiers 2A and 2B are respectively controlled in a coordinated manner based on a control command output from the host controller 1.

In the machine control system 100 thus configured, when any one of the movable elements is operated by driving the motors 3A and 3B, the reaction force is propagated to cause other movable elements to vibrate. So far, each drive shaft control system independently performs vibration suppression control on vibration generated in such a mechanical system by a disturbance suppression function (such as using an observer) included in the servo amplifiers 2A and 2B.

However, for example, in a precision equipment manufacturing operation as performed in recent semiconductor manufacturing apparatuses and the like, very high operation accuracy up to μm order is required. On the other hand, as described above, if each drive shaft control system just independently executes the vibration suppression control by the disturbance suppression function, a response will be delayed since correspondence is performed after vibration is actually received. There is a risk that a sufficient vibration suppression effect cannot be obtained because, for example, high vibration suppression accuracy corresponding to a generation factor of a minute vibration such as a jerk cannot be obtained.

On the other hand, in the present embodiment, the controller 1 generates a second control command for driving and controlling the second motor 3B based on the jerk in the first control command for driving and controlling the first motor 3A.

In other words, in the controller 1 that monitors all control commands to be executed by each drive shaft control system, it is possible to grasp which drive shaft control system and movable element generate what jerk at what timing and whether this becomes a generation factor of vibration for the movable element of another drive shaft control system. Therefore, the controller 1 thus configured can generate the second control command that commands to the second motor 3B, which is the other drive shaft control system described above, so that vibration suppression control corresponding suitably to the generation timing and contents (magnitude, phase, etc.) of the jerk generated in the first motor 3A can be executed. Hereinafter, a method for performing such vibration suppression control will be described in detail.

3. Method of Generating Vibration Suppression Command

Figure 2:
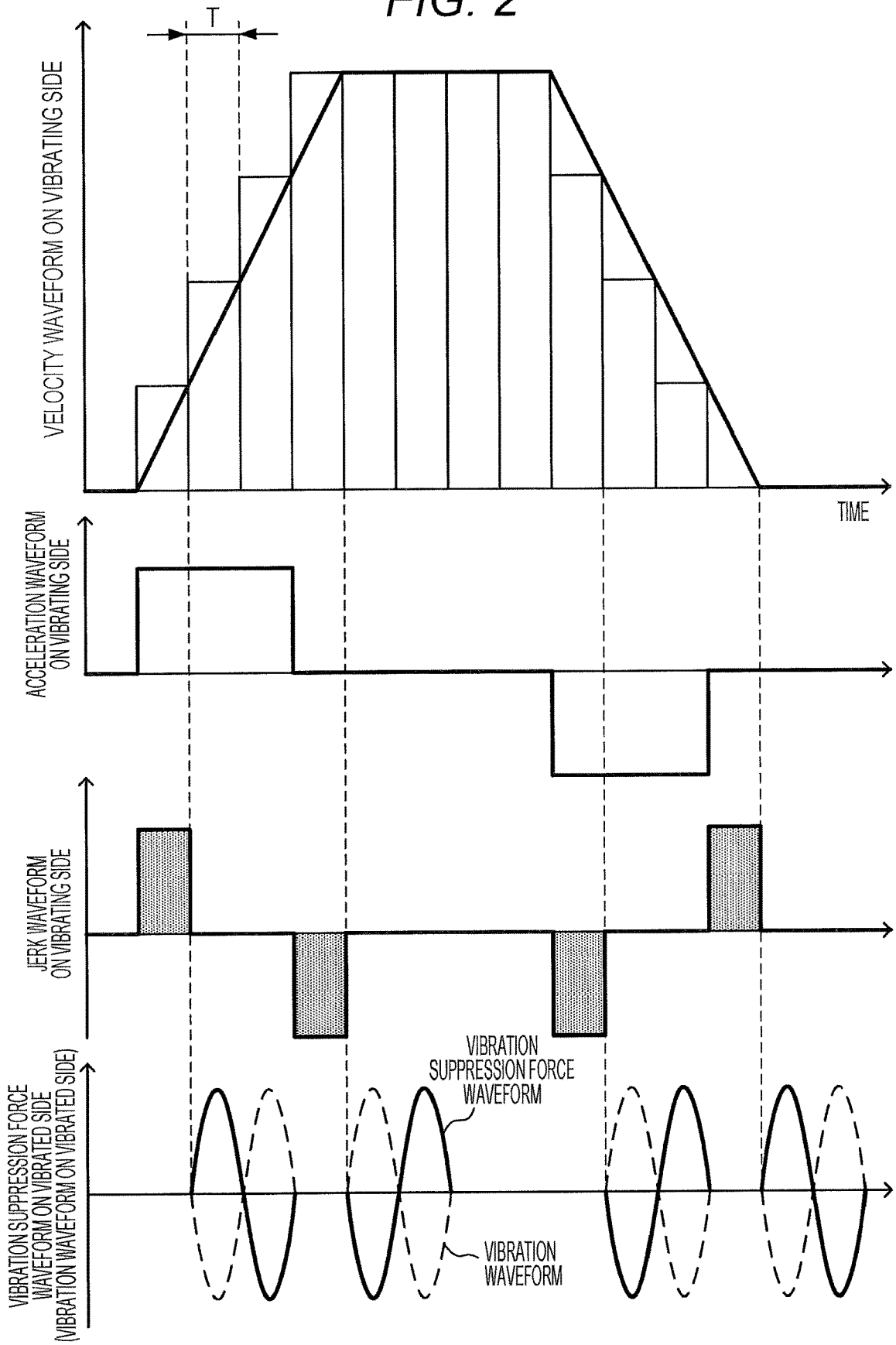
FIG. 2 is a time chart for explaining a method of generating a vibration suppression command.

The generation of a jerk in the example shown in FIG. 1 and a method of generating a vibration suppression command corresponding thereto will be described with reference to the time chart of FIG. 2. In FIG. 2, four time charts are shown. Sequentially from the uppermost, an example of a velocity waveform in the drive shaft control system on a side on which a jerk is generated (the first motor 3A side of the example of FIG. 1; hereinafter referred to as the vibrating side), its acceleration waveform, and its jerk waveform are shown, and at the lowermost, a vibration waveform generated in the drive shaft control system on a side to which vibration is applied by the jerk generated on the vibrating side (the second motor 3B side of the example of FIG. 1; hereinafter referred to as the vibrated side) and a vibration suppression force waveform to be generated corresponding thereto are shown in an overlapping manner.

In the example shown in FIG. 2, first, the drive shaft control system on the excitation side controls the motor speed with a substantially trapezoidal waveform as shown in the uppermost time chart by position control or velocity control. At this time, the controller 1 and the servo amplifier 2A sequentially transmit and receive control commands in synchronization with the same cycle that is sufficiently short (hereinafter referred to as the communication control cycle T). Consequently, even when the content of the control command transmitted from the controller 1 varies with time, the servo amplifier 2A can perform follow-up control corresponding to the variation of the control command with sufficient real-time characteristics. That is, in the illustrated time chart of the vibrating side velocity waveform, the height of each rectangular graph divided (sampled) in units of the communication control cycle T corresponds to an instantaneous value of a velocity command in the servo amplifier 2A of the exciting side at each cycle period.

Corresponding to such a velocity waveform, as shown in the second time chart from the top, a motor acceleration is generated with a rectangular waveform extending to a positive-value side (upper side in the drawing) during a period when the motor speed is accelerating, the motor acceleration is generated with a rectangular waveform extending to a negative-value side (lower side in the drawing) during a period when the motor speed is decelerating, and the motor acceleration is not generated during other periods when the motor is stopped or the motor speed is constant.

Corresponding to such an acceleration waveform, as shown in the third time chart from the top, a motor jerk is generated with a rectangular waveform extending to the positive-value side when the motor acceleration rises, the motor jerk is generated with a rectangular waveform extending to the negative-value side when the motor acceleration is lowered, and the motor jerk is not generated during other periods when the motor acceleration is 0 or constant. The magnitude of the jerk corresponds to a second-order time differential value of the velocity command, in other words, a value obtained by dividing an amount of change in the command unit of a movement position by the square value of a cycle period of the communication control cycle T. Both the motor acceleration and the motor jerk described above are sampled in cycle units of the communication control cycle T, and, in particular, since the motor acceleration is generated with a rectangular waveform, each motor jerk is represented by a pulse waveform for one cycle (instantaneous value with a symbol).

The reaction force against the jerk generated in the drive shaft control system on the vibrating side as described above becomes, for example, a vibrating force that propagates through the common stator 31 in the configuration of FIG. 1 and vibrates the drive shaft control system on the vibrating side. Then, as shown in the lowermost time chart, on the vibrated side, a position vibration of a substantially sinusoidal waveform (see a broken line waveform in the drawing) is generated by the above vibrating force at the corresponding timing after the generation of the jerk on the vibrating side. On the other hand, in the present embodiment, with respect to the driven shaft control system (the second motor 3B in this example) on the vibrated side, the vibration suppression control is performed so as to add a vibration suppression force generated with a substantially sinusoidal waveform and an opposite phase waveform (see a solid line waveform in the drawing) of the position vibration, so that vibration on the vibrated side can be cancelled.

Here, the controller 1 manages a control schedule of what control command is output at which cycle period for each of all the drive shaft control systems included in the machine control system 100. For this reason, the controller 1 can grasp which movable element of the drive shaft control system generates what jerk at what cycle period and becomes the vibrating side and whether the jerk becomes a generation factor of vibration for the movable element of another drive shaft control system that becomes the vibrated side. Therefore, the controller 1 may generate and output the vibration suppression command suitably corresponding to the generation timing and content (magnitude, phase, etc.) of the jerk generated in the first motor 3A on the vibrating side with respect to the second motor 3B on the vibrated side.

4. Specific Form of Vibration Suppression Command

As a specific form of the vibration suppression command generated by the controller 1 by the above method, in the example of the present embodiment, the vibration suppression command is generated in the form of a thrust feedforward command input to the servo amplifier 2B so that an arbitrary vibration suppression force can be added to the linear motor 3B.

Figure 3:
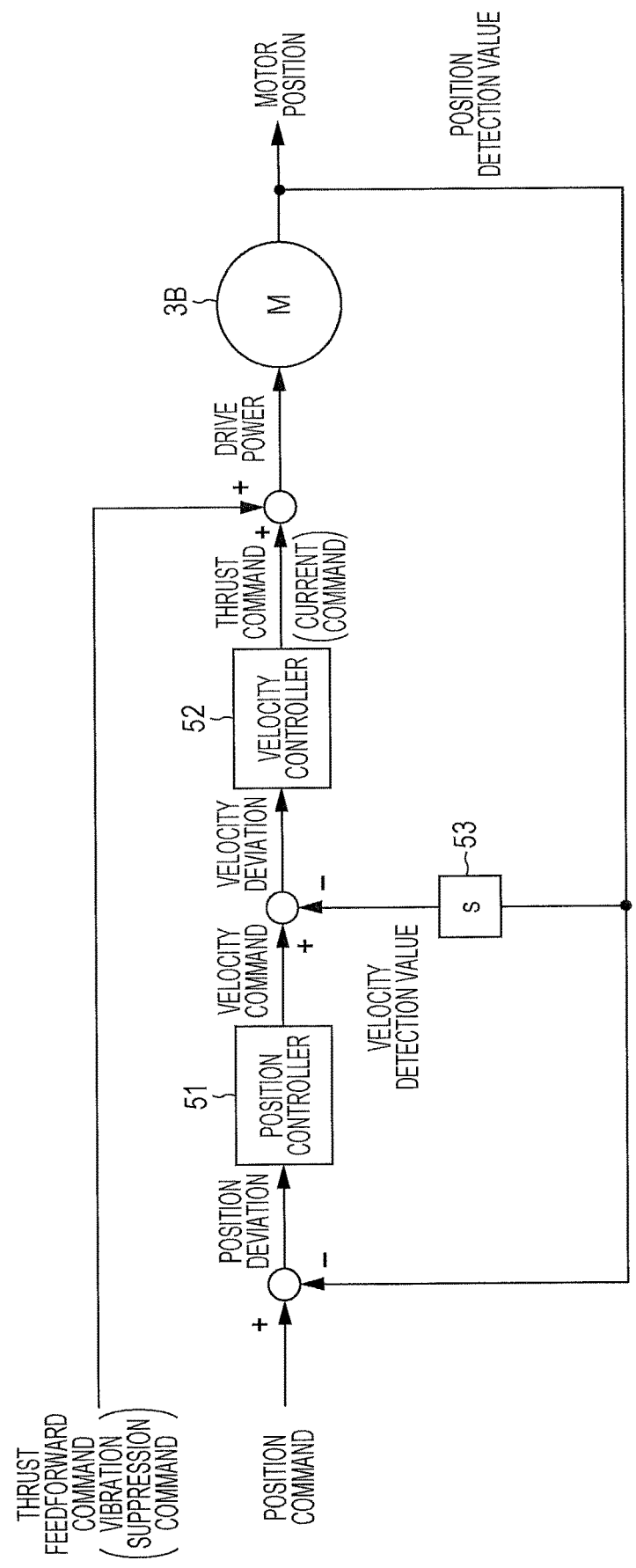
FIG. 3 is a view showing a control processing loop of a servo amplifier.

For example, when general position control processing executed in the servo amplifier 2B is expressed in a transfer function format, the processing becomes double loop processing of a position control feedback loop and a velocity control feedback loop as shown in FIG. 3. In the double loop processing, a deviation between the position command and a position detection value of the motor 3B is obtained as a position deviation from the controller 1, and a position control controller 51 generates a velocity command based on the position deviation. Further, a deviation between the velocity command and a velocity detection value of the motor 3B (a first-order time differential value of the position detection value by a differential operator 53) is obtained as a velocity deviation, and based on the velocity deviation, a velocity controller 52 generates a thrust command. Then, the thrust command is used as a power command, and the motor 3B is driven by supplying the corresponding drive power. When velocity control processing is performed, the velocity command may be input from the controller 1 in single loop processing in which the position controller 51 is omitted. A command directly added to the thrust command in such loop processing is a thrust feedforward command, and the controller 1 generates a vibration suppression command in the form of such a thrust feedforward command.

Figure 4:
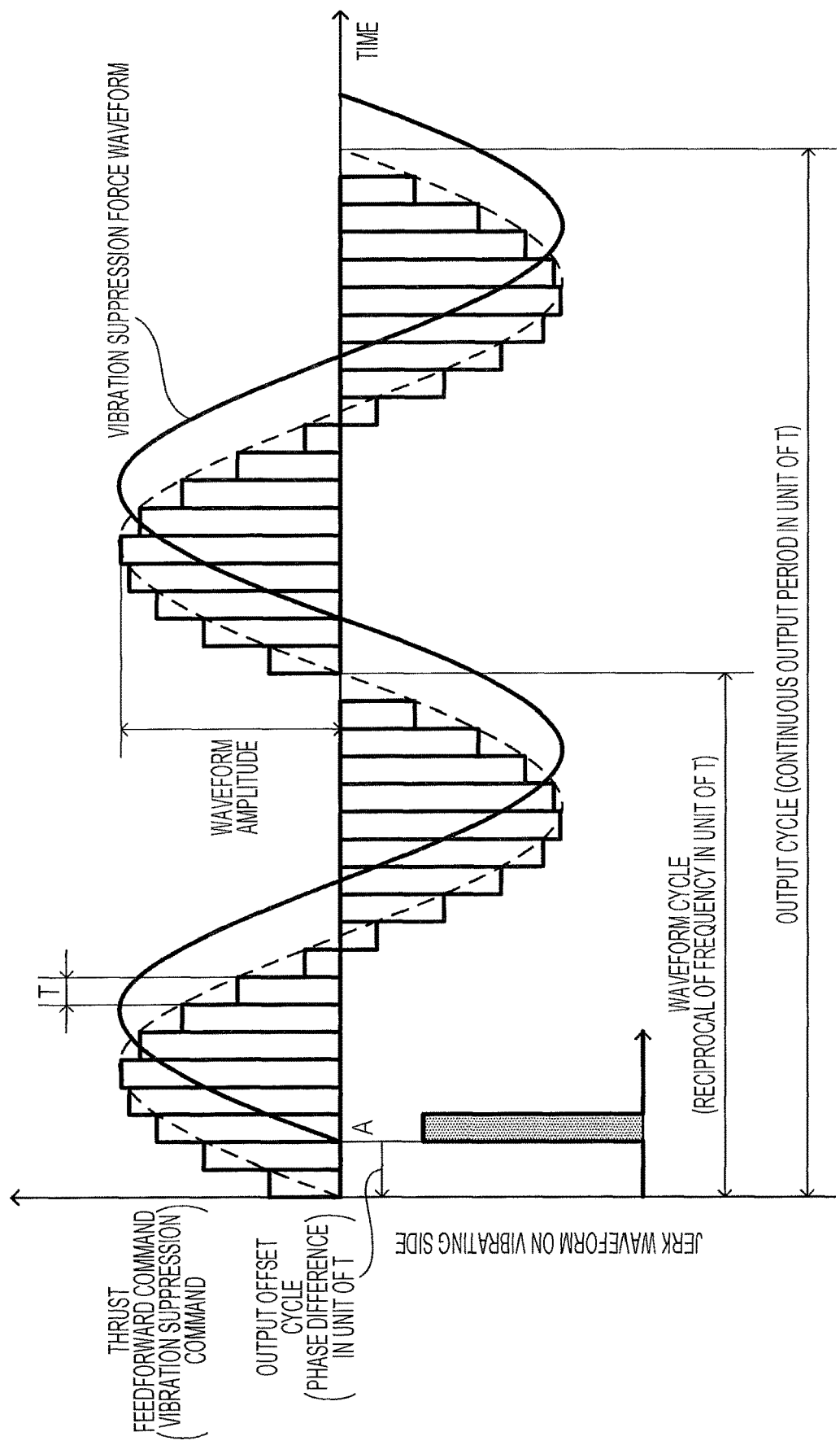
FIG. 4 is a time chart for explaining a specific form of the vibration suppression command.

FIG. 4 is a time chart showing an example of the vibration suppression command generated in the form of the thrust feedforward command. As described above, the position vibration in the drive shaft control system on the vibrated side is generated with a substantially sinusoidal waveform. Therefore, it is desirable that the vibration suppression force for canceling this vibration is added as close as possible to the substantially sinusoidal waveform of the opposite phase, and it is desirable that the thrust feedforward command for controlling the vibration suppression force is also generated close to such a sinusoidal waveform of the opposite phase. Depending on a setting mode of a reference coordinate system in the drive machine 4 and an arrangement relationship between the drive shaft control systems on the vibrating side and the vibrated side, even with the same jerk, the phase of the vibration waveform generated on the vibrated side can be both the same phase and the opposite phase as the jerk. For this reason, it is preferable to generate a vibration suppression command with the thrust feedforward command with an anti-phase waveform based on the vibration waveform of the movable element on the vibrated side, instead of using the jerk as a reference.

When a time corresponding to a plurality of the communication control cycles T is required until vibration is sufficiently attenuated after generated on the vibrated side, the servo amplifier 2B needs to continuously add the thrust feedforward command for vibration suppression control to a torque command during the plurality of cycles (hereinafter, referred to as an output cycle). Therefore, the controller 1 generates the thrust feedforward command in time series with a value obtained by sampling the substantially sinusoidal waveform of the vibration suppression force at the communication control cycle T, and continuously outputs the thrust feedforward command as the vibration suppression command during an appropriately set output cycle.

A specific content of the vibration waveform actually received on the vibrated side is affected by not only the generation content (for example, amplitude, phase, etc.) itself of the jerk on the vibrating side, which is the factor, but also various elements such as rigidity and connection configuration of mechanical elements connected between the drive shaft control systems on the vibrating side and the vibrated side, a mass ratio of each movable element, and an inter-shaft arrangement relationship (direction and distance) of the drive shaft control system. For this reason, it is desirable that the specific generation content of the thrust feedforward command be generated with a content corresponding to a mechanical relationship between the drive shaft control system on the vibrating side and the drive shaft control system on the vibrated side.

Here, in general, a sinusoidal waveform can be uniquely defined by three waveform parameters of amplitude, frequency, and phase. However, in the vibration of a substantially sinusoidal waveform generated on the vibrated side, the amplitude including its phase (positive and negative signs) is proportional to the amplitude of the jerk on the vibrating side, and the frequency depends on the mechanical relationship between the vibrating side and the vibrated side and attenuates with time. For this reason, when an effective thrust feedforward command is generated on the vibrated side, it is desirable to generate the thrust feedforward command with an amplitude obtained by multiplying an amplitude (a value increasingly and decreasingly changing in accordance with the normal control command) of the jerk generated on the vibrating side by an amplitude suitably set in advance and with a sinusoidal waveform defined by the frequency and output cycle suitably set in advance corresponding to a combination of the vibrating side and the vibrated side. In the example of the present embodiment, the waveform parameters of the amplitude ratio, frequency, and output cycle are suitably set in advance by manual adjustment operation, for example, and stored in the controller 1 generating the vibration suppression command.

In a vibration suppression force waveform in an example shown in FIG. 4, a case is shown where setting is performed such that the amplitude ratio to the amplitude of the jerk is +1 (that is, the jerk and the vibration suppression force are in the same phase→the jerk and the vibration are in the opposite phase), a waveform cycle corresponds to 19 cycles in the unit of the communication control cycle T, and the output cycle corresponds to 2 cycles (38 cycles in the unit of T) in the cycle unit of the sinusoidal waveform. In other words, the above-described waveform cycle can be said to be at a frequency corresponding to 1/19 cycle in the unit of the communication control cycle T. For the frequency related to time and the waveform parameter of the output cycle, it is desirable for the function to be set the frequency and the waveform parameter based on the scale of the communication control cycle T. However, instead of this, the frequency and the waveform parameter may be set based on any one of the scale of the sinusoidal waveform frequency of the vibration suppression force and the scale of a real time. Setting of the amplitude ratio will be described later separately.

In general motion control communication, when a time corresponding to a predetermined cycle of the communication control cycle T may be required from when the controller 1 outputs a command until the servo amplifier 2B actually executes the command. Depending on the mechanical relationship between the vibrating side and the vibrated side, a time corresponding to a predetermined cycle may be required for propagation of mechanical vibration between the vibrating side and the vibrated side. On the other hand, when the controller 1 outputs a vibration suppression command, the controller 1 outputs the vibration suppression command at a cycle period offset by the number of cycles (−2 T in the illustrated example) suitably set in advance from a cycle period A at which a jerk is generated. Since this output offset cycle depends on a communication control function between the controller 1 and the servo amplifier 2B, the mechanical relationship between the vibrating side and the vibrated side, and the like, this parameter is also suitably set in advance by manual adjustment operation, for example, and stored in the controller 1.

It is desirable that in the anti-phase waveform of the vibration suppression force, the vibration waveform fits as well as possible the amplitude, the frequency, and the output cycle. However, a constant vibration suppression effect can be obtained simply by outputting the vibration suppression force, whose polarity is opposite to the instantaneous value of the vibration waveform at least in a predetermined cycle period, for one communication control cycle T.

Figure 5:
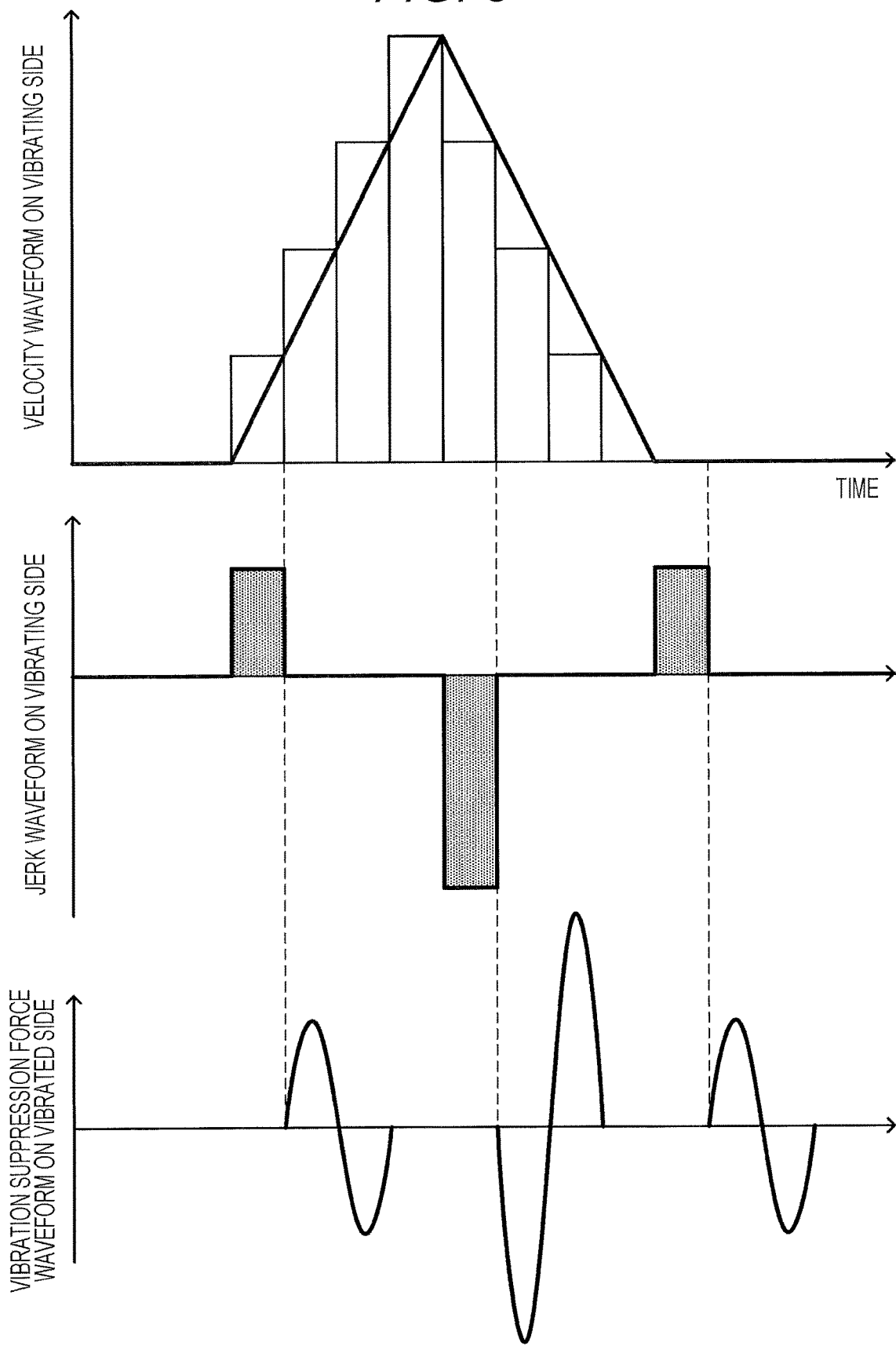
FIG. 5 is a time chart showing an example of a velocity control sequence in which the magnitude of a jerk changes.

5. Calculation of Waveform Amplitude of Vibration Suppression Command Waveform For example, as shown in the time chart of FIG. 5, the magnitude (sign, absolute value) of the generated jerk may change depending on a sequence of the velocity control executed on the vibrating side. Since the controller 1 manages the output schedule and contents of all control commands for all drive shaft control systems as described above, it is possible to calculate the generation cycle period and magnitude of all jerks in advance, generate the corresponding vibration suppression command with a suitable magnitude (phase, amplitude), and output the vibration suppression command at a suitable cycle period.

Figure 6:
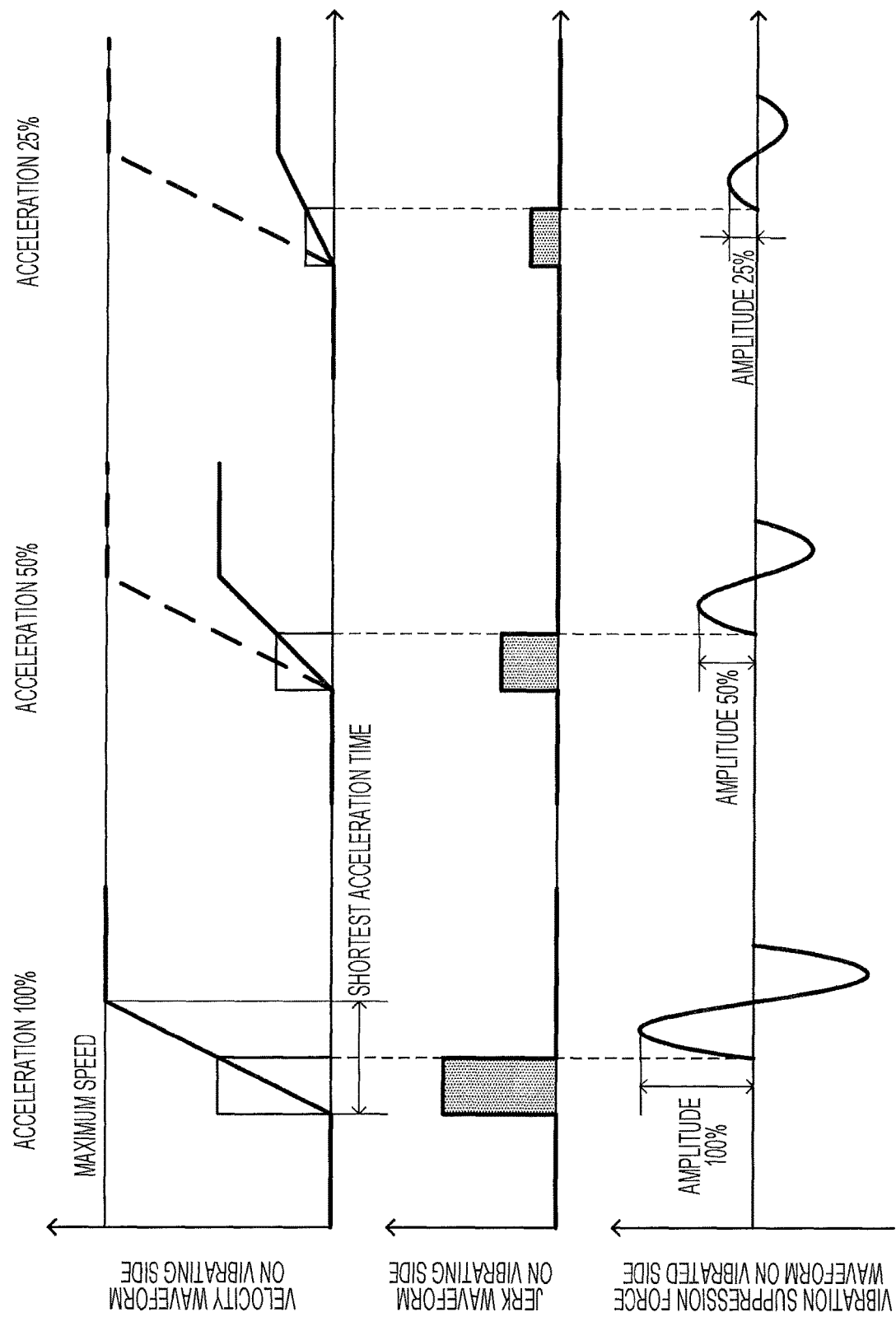
FIG. 6 is a time chart for explaining calculation of a waveform amplitude of a vibration suppression command waveform.

The controller 1 calculates a waveform amplitude of a vibration suppression command waveform by multiplying the magnitude of the jerk, generated by the control command as described above, by the amplitude ratio set in advance as appropriate. In the example of the present embodiment, in addition, the waveform amplitude of the vibration suppression force waveform that is an actual vibration suppression command is calculated based on a ratio obtained by normalizing the maximum amplitude. For example, in the example shown in FIG. 6, as shown in a time chart column on the left side of the drawing, when the velocity waveform on the vibrating side reaches a maximum velocity in a shortest acceleration time, that is, when the acceleration is maximum (see the upper row), the waveform amplitude (see the bottom row) of the vibration suppression force on the vibrated side can be calculated by multiplying the magnitude of jerk (see the middle row) corresponding to the acceleration by the amplitude ratio set in advance by manual adjustment or the like. This amplitude is the maximum amplitude of the vibration suppression force waveform that can be added on the vibrated side, and is normalized as 100%.

Consequently, for example, the amplitude of the vibration suppression force waveform to be added to the vibrated side corresponding to a case where the acceleration is 50% in the control command may be calculated as 50% of the maximum amplitude (see the central time chart column in the drawing). The amplitude of the vibration suppression force waveform to be added to the vibrated side corresponding to a case where the acceleration is 25% in the control command may be calculated as 25% of the maximum amplitude (see the right time chart column in the drawing). Then, an instantaneous value of the thrust feedforward command of the vibration suppression command to be output at each cycle period may be calculated by multiplying the waveform amplitude value calculated as described above by an angular velocity corresponding to the waveform frequency and a sinusoid function at an elapsed cycle.

6. Superimposition of Vibration Suppression Command Waveform

Figure 7:
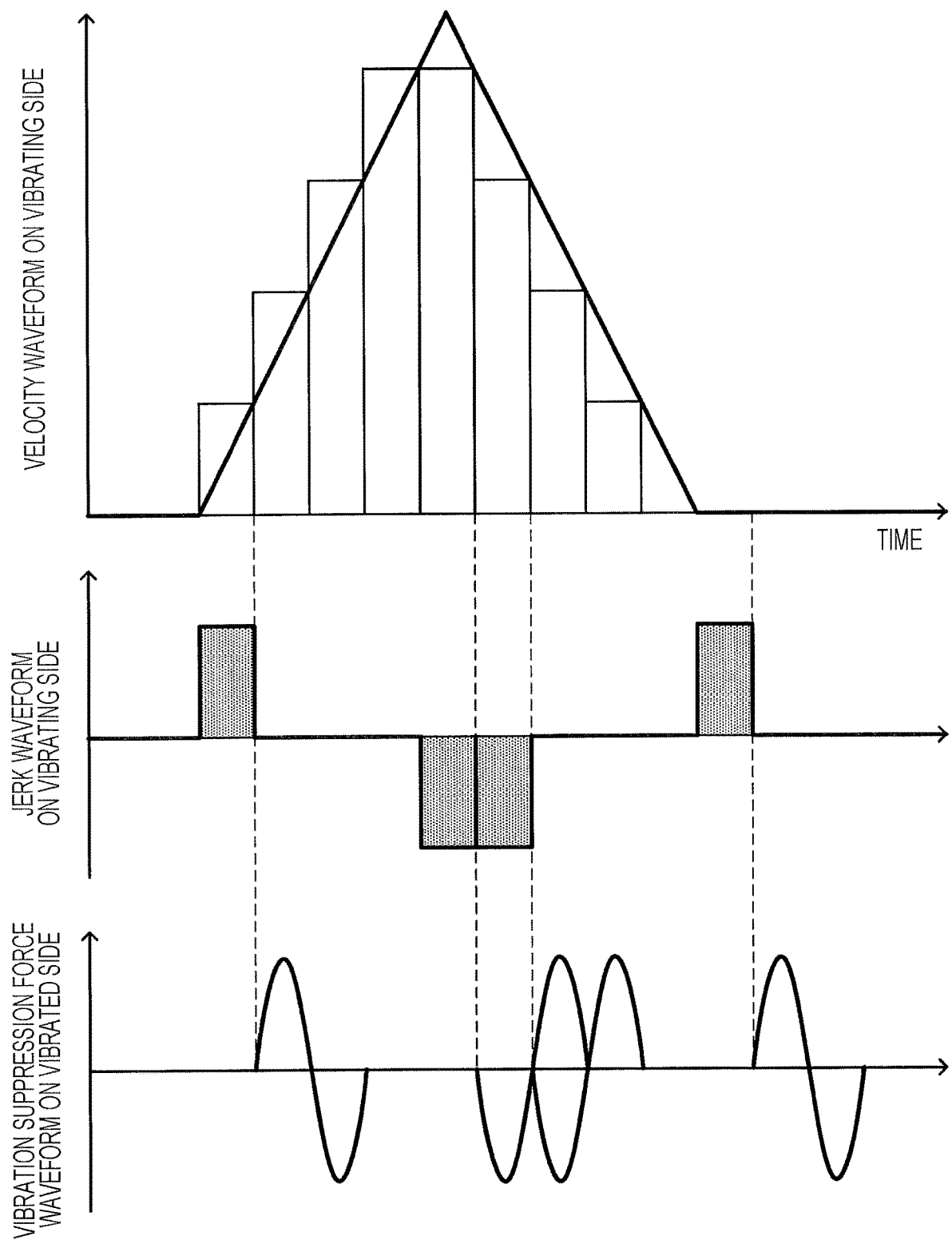
FIG. 7 is a time chart showing an example of a velocity control sequence in which vibration suppression force waveforms overlap.
Figure 8:
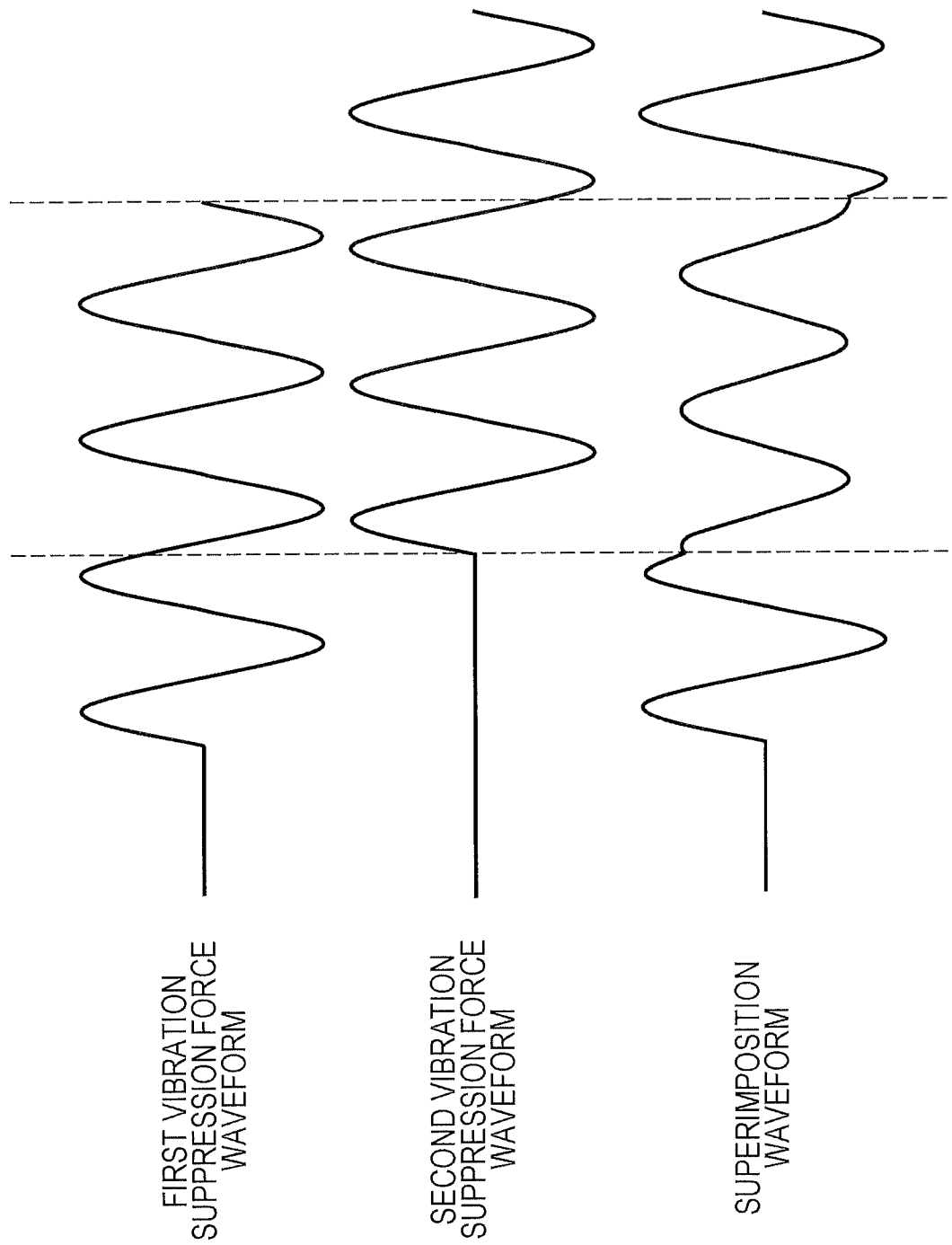
FIG. 8 is a time chart for explaining superimposition of the vibration suppression commands.

For example, as shown in the time chart of FIG. 7, depending on the velocity control sequence executed on the vibrating side, the jerk may be generated at short time intervals (in the illustrated example, continuous cycle periods). In this case, before the vibration generated corresponding to the previous jerk is attenuated, the vibration generated corresponding to the subsequent jerk is combined so as to be superimposed and propagates to the movable element on the vibrated side. On the other hand, in the present embodiment, the controller 1 individually generates a substantially sinusoidal waveform (the time length is limited by the output cycle) of the vibration suppression force corresponding to each jerk, then superimposes the substantially sinusoidal waveforms as in the example shown in FIG. 8, and generates the thrust feedforward command for the vibration suppression command in each cycle period from the instantaneous value of the synthesized waveform.

Figure 9:
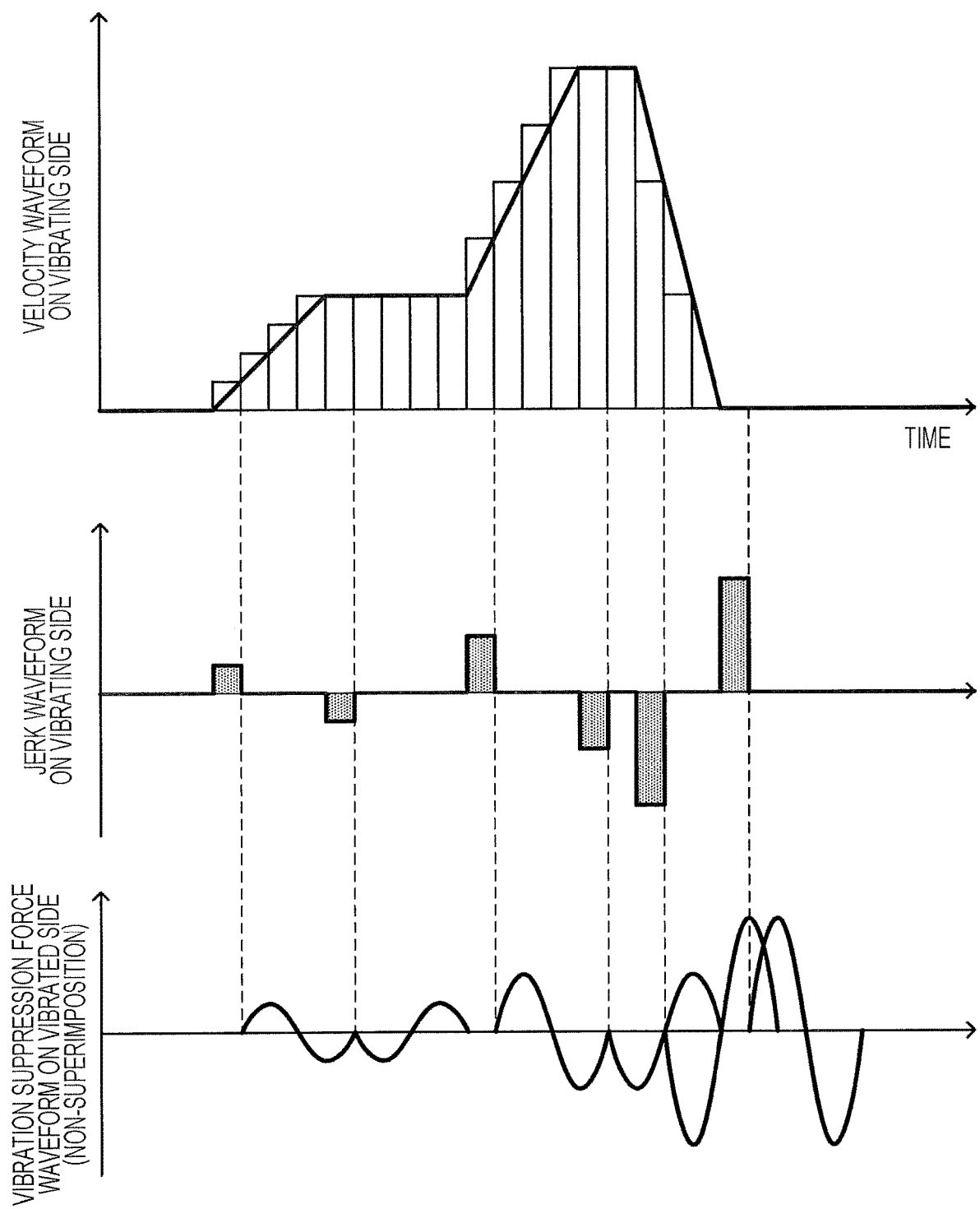
FIG. 9 is a time chart showing an example of a velocity control sequence in which a jerk is frequently generated.

There are cases where a jerk is frequently generated at short time intervals as in the time chart shown in FIG. 9. If this frequency is higher, or if the output cycle of each vibration suppression force waveform is long, three or more vibration suppression commands may be superimposed. On the other hand, the controller 1 stores a predetermined number of jerks generated in the immediately past as a history and may generate the vibration suppression command of the thrust feedforward command with a superimposed waveform of the vibration suppression force waveform (anti-phase waveform) corresponding to each jerk. Even if a generation time interval between the previous jerk and the subsequent jerk is sufficiently long, since the time length is limited by the output cycle for each corresponding vibration suppression force waveform (i.e., the instantaneous value becomes 0 after the output cycle), unnecessary superimposition processing can be avoided. The number of jerks to be stored may be set as appropriate according to the length of the output cycle and a storage capacity of a storage device.

7. Effective Minimum Jerk

Figure 10:
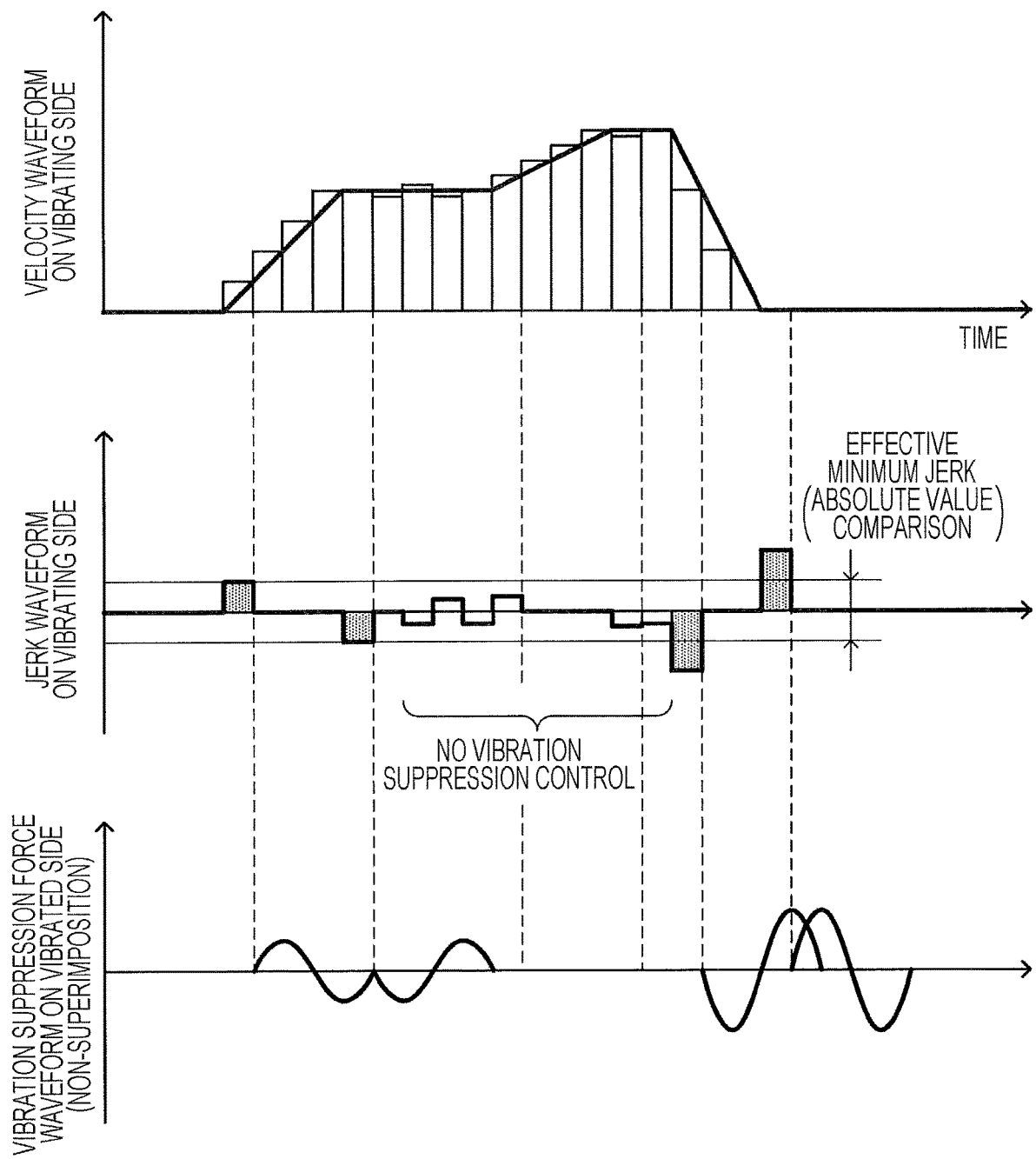
FIG. 10 is a time chart showing an example of a velocity control sequence in which a minute jerk less than an effective minimum acceleration is generated.

For example, when the controller 1 outputs a control command such as an interpolation operation, as shown in the time chart of FIG. 10, a sufficiently small variation in a moving speed of the movable element may occur, and a minute jerk may be generated. However, such a minute jerk generated on the vibrating side hardly affects the drive shaft control system on the vibrated side (only negligible vibration occurs). Contrarily, when the vibration suppression command is output in response to all minute jerks that is frequently generated on the vibrating side, the drive shaft control system on the vibrated side may oscillate. On the other hand, in the present embodiment, the vibration suppression command is generated only in correspondence with the jerk that is equal to or greater than an effective minimum jerk as a suitably set threshold. In other words, if the generated jerk is less than the effective minimum jerk, the vibration suppression control is not executed. The effective minimum jerk at this time is set as an absolute value, and it is determined whether or not the vibration suppression command is generated as compared with the absolute value of each positive and negative jerk.

8. Effects of the Present Embodiment

As described above, according to the machine control system 100 of the present embodiment, a machine control device (in this example, a collective term for a plurality of the servo amplifiers 2A and 2B and the controller 1) that controls the drive of the machine control system 100 generates the second control command for driving and controlling the second motor 3B based on the jerk in the first control command for driving and controlling the first motor 3A. Consequently, for the second motor 3B of the drive shaft control system on the vibrated side, it is possible to generate the second control command to execute vibration suppression control suitably corresponding to the generation timing and contents (magnitude, phase, etc.) of the jerk generated in the first motor 3A on the vibrating side. As a result, it is possible to improve a mutual vibration suppression function among the plurality of drive shaft control systems.

Particularly in the present embodiment, the machine control device generates a second control command in which the vibration suppression command based on the jerk in the first control command is added to the normal control command for driving and controlling the second motor 3B. Consequently, the normal control of the position control and velocity control executed by the normal control command for the second motor 3B can be executed, as well as the vibration suppression control in the vibration suppression command suitably corresponding to the reaction force (thrust, etc.) received by an externally generated jerk.

In the present embodiment, in particular, the machine control device includes the plurality of servo amplifiers 2A and 2B that individually drive and control the plurality of motors 3A and 3B, and the controller 1 that generates the first control command and the second control command to the plurality of servo amplifiers 2A and 2B. The controller 1 adds, as the thrust feedforward command, the vibration suppression command in the second control command to the thrust command of the normal control that drives and controls the second motor 3B. The controller 1 generates the thrust feedforward command based on the jerk in the first control command.

As described above, the machine control device is configured with the plurality of servo amplifiers 2A and 2B that control the drive of each of the motors 3A and 3B, and the controller 1 that integrally controls the plurality of servo amplifiers 2A and 2B, whereby machine control processing of the entire machine control system 100 can be functionally shared by each device. Then, the controller 1 generates a vibration suppression command in the form of the thrust feedforward command, and the servo amplifier 2B adds the thrust feedforward command, input as the vibration suppression command, to the thrust command, so that the normal control of the position control and the velocity control separately executed by the servo amplifier 2B is not affected, and the vibration suppression control can be executed with the thrust suitably corresponding to the reaction force (thrust) received by an externally generated jerk.

The controller 1 that monitors the control command and the vibration suppression command to each of the drive shaft control systems on the vibrating side and the vibrated side easily generates the thrust feedforward command with contents corresponding to the mechanical relationship between the two drive shaft control systems and can output itself as the vibration suppression command to the servo amplifier 2B on the vibrated side. Then, in the servo amplifier 2B to which such a vibration suppression command is input, it is only necessary to add the vibration suppression command in the form of the thrust feedforward command to the thrust command as it is, so that processing load of the servo amplifier 2B can be reduced.

Although not particularly shown, the servo amplifier 2B may generate the thrust feedforward command In this case, the servo amplifier 2B stores in advance the waveform parameters (amplitude ratio, frequency, and output cycle) that define the sinusoidal waveform of the vibration suppression force, and the controller 1 outputs, as the vibration suppression command, information, corresponding to the magnitude (sign, amplitude) of the jerk generated on the vibrating side, at a suitable cycle period. Then, the servo amplifier 2B may generate the corresponding thrust feedforward command for each cycle period based on the waveform parameter and the vibration suppression command and add the thrust feedforward command to the thrust command.

In the present embodiment, in particular, the vibration suppression command is generated in time series with a value sampled at the communication control cycle T between the controller 1 and the servo amplifier 2B. Consequently, even with the servo amplifier 2B that performs motion control processing for each of the communication control cycles T, vibration suppression control with the vibration suppression force waveform over a plurality of the communication control cycles T is enabled.

In the present embodiment, in particular, the vibration suppression command is output at a cycle period offset by a predetermined number of cycles from a generation cycle period of a jerk in the communication control cycle T. This can cause the servo amplifier 2B to start executing the vibration suppression control suitably in response to the timing when the movable element on the vibrated side actually starts to vibrate.

In the present embodiment, in particular, the vibration suppression command is generated with an anti-phase waveform (at least positive and negative may be inverted) of the vibration waveform generated in the movable element due to a jerk. As described above, when the vibration suppression command is generated with the thrust feedforward command with the anti-phase waveform based on the vibration waveform of the movable element on the vibrated side, instead of using the jerk as a reference, it is possible to perform control so as to cancel vibration generated in the movable element.

In the present embodiment, in particular, the anti-phase waveform (vibration suppression force waveform) of the vibration waveform on the vibrated side is generated with a substantially sinusoidal waveform defined by the waveform parameter of at least one of the amplitude ratio with respect to a jerk, the frequency, and the output cycle. Consequently, the waveform parameters of the amplitude ratio, the frequency, and the output cycle are suitably set in advance by manual adjustment operation, for example, and if the amplitude of the jerk generated can be specified, the thrust feedforward command of a sinusoidal waveform effective for the vibration suppression function can be generated.

In the present embodiment, in particular, the vibration suppression command is generated with a superimposed waveform of anti-phase waveforms respectively corresponding to a predetermined number of jerks generated in the immediately past. Consequently, even with respect to the vibration waveform synthesized by a plurality of jerks generated at short time intervals, the servo amplifier 2B functionally cancels the vibration with a single vibration suppression command (thrust feedforward command) input for each of the communication control cycles T and can perform vibration suppression control.

In the present embodiment, in particular, the vibration suppression command is generated corresponding to the jerk that is equal to or greater than the threshold of the effective minimum jerk. Consequently, for example, even when velocity control is performed such that a minute jerk is frequently generated on the vibrating side, control stability of the drive shaft control system can be improved while maintaining a sufficient vibration suppression function on the vibrated side.

In the example of the present embodiment, the description has been made on the assumption that one first motor 3A is the vibrating side and the other second motor 3B is the vibrated side. However, conversely, there are many cases where there is a causal relationship of vibration with each other so that the second motor 3B is the vibrating side and the first motor 3A is the vibrated side. In either case, the controller 1 may generate the control command on the vibrated side based on the jerk on the vibrating side. If there is no symmetry in a mechanical relationship that affects the vibration waveform of the movable element, that is, if the vibration waveform (waveform parameter, the number of offset cycles) changes when the vibrating side and the vibrated side are reversed, the controller 1 stores the waveform parameter and the number of offset cycles for each combination (in this example, two ways) of directional relationships between the vibrating side and the vibrated side and generates a vibration suppression command having the corresponding contents.

The thrust feedforward command, which is a vibration suppression command, may be input at any cycle period regardless of whether the drive shaft control system on the vibrated side is stopped or operating (movable element is moving). The amplifier 2B may perform control in response to a thrust command, obtained by adding the thrust feedforward command of the vibration suppression command, in real time.

In the above embodiment, the vibration suppression command corresponding to the generation of a jerk in the first control command (normal control command) to the vibrating side is generated, and this vibration suppression command is added to only the normal control command to the vibrated side and output as the second control command. However, the present invention is not limited thereto. For example, even in the control command output from the controller 1 to any drive shaft control system, the controller 1 may output the control command in a form in which the vibration suppression command is always added to the normal control command. In this case, while the jerk is not generated on one drive shaft control system side, the vibration suppression command (thrust feedforward command) on the other drive shaft control system side may be generated with a zero value.

In the vibration suppression method of the present embodiment, the mechanical arrangement relationship between the vibrating side and the vibrated side is not limited to the arrangement relationship on the same straight line as in the example shown in FIG. 1. For example, including a parallel arrangement relationship, an arrangement relationship forming a predetermined angle (including orthogonality), a spatial twist arrangement relationship, and the like, the vibration suppression method can be applied to various arrangement relationships in which a jerk can propagate and exert a mechanical effect. For example, in the case of a drive machine further provided with a plurality of so-called gantry mechanisms for driving the same movable element with a plurality of motors arranged in parallel, a vibration suppression command corresponding to a jerk in the gantry mechanism on the vibrating side is input to all servo amplifiers of the gantry mechanism on the vibrated side, and thus to obtain a vibration suppression function (not shown).

The motor used in the drive shaft control system is not limited to a direct-driven type linear motor, and the vibration suppression method of the present embodiment can be applied even when a rotary motor is used. In this case, the thrust command in the loop processing shown in FIG. 3 is a torque command, and the thrust feedforward command of the vibration suppression command is a torque feedforward command. The movable element is assumed to be a direct-driven mechanical element via a ball screw or pinion-rack mechanism, and the vibration on the vibrated side is assumed to be vibration at a rotational position of an output shaft of a rotary motor or vibration in the direct-driven mechanical element. Even when a direct-driven type motor and a rotary motor are provided in combination, the vibration suppression method of the present embodiment is applicable.

9. Modified Examples

The disclosed embodiment is not limited to that described above, but may be modified in various forms so long as it does not deviate from the scope and the technical concept. Such modified examples will be described below.

<Case where Three or More Drive Shaft Control Systems are Provided>

Figure 11:
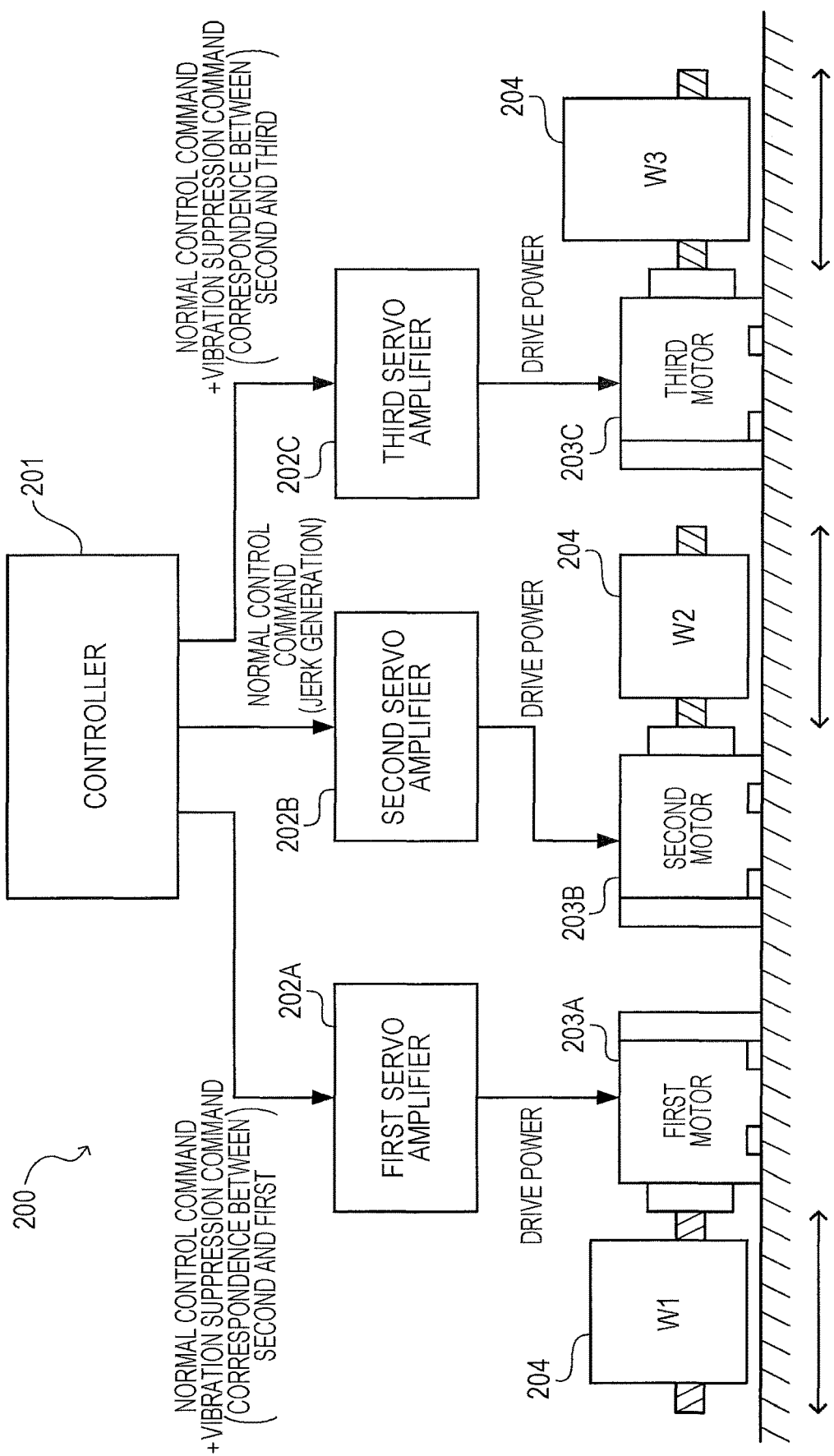
FIG. 11 is an explanatory view showing an example of an overall configuration of a machine control system according to a modified example in which three drive shaft control systems are provided.

In the above embodiment, the machine control system including the two drive shaft control systems has been described. However, as shown in FIG. 11 corresponding to FIG. 1, the same vibration suppression method as in the above embodiment can be applied to a machine control system 200 including three drive shaft control systems. In the illustrated example, first to third motors 203A, 203B, and 203C of each drive shaft control system are of a rotary type, and only the first motor 203A is opposite to the other second and third motors 203B and 203C in the tip direction of the output shaft (that is, the rotation direction). This example also shows a case of including a drive machine 204 that reciprocates weights W1, W2, and W3 having different masses via a screw feed mechanism such as a ball screw.

As described above, when the drive shaft control system having three or more shafts is provided, when any one drive shaft control system becomes the vibrating side when the jerk is generated in the control command in the drive shaft control system, the controller 201 may output the vibration suppression command to all other drive shaft control systems as the vibrated side.

However, in many cases, for each combination of two drive shaft control systems that have a relationship between the vibrating side and the vibrated side, a mechanical relationship between them differs. The illustrated example shows a case where the drive shaft control system of the second motor 203B is the vibrating side and the drive shaft control system of each of the other first motor 203A and the third motor 203C is the vibrated side. Due to the difference in mass between the weights W1, W2, and W3 described above and the difference in the motor shaft direction, the mechanical relationship in a combination of the second motor 203B and the first motor 203A is different from the mechanical relationship in a combination of the second motor 203B and the third motor 203C. Although not particularly illustrated, for example, when the first motor 203A is on the vibrating side, due to a difference in installation distance between shafts, the mechanical relationship in the combination of the first motor 203A and the second motor 203B is different from the mechanical relationship in a combination of the first motor 203A and the third motor 203C.

As described above, the waveform shape (amplitude ratio, frequency, output cycle) of the vibration suppression force waveform serving as a reference for the vibration suppression command, and the cycle period (the number of offset cycles) at which the vibration suppression command is output depend on the mechanical relationship including directionality between the vibrating side and the vibrated side. For this reason, the vibration suppression command output to each of the drive shaft control systems on the vibrated side is desirably generated with contents corresponding to a shaft combination with the drive shaft control system on the vibrating side and the directional relationship individually for each drive shaft control system. In the illustrated example, a vibration suppression command with a content corresponding to a shaft combination in which the second motor 203B is on the vibrating side and the first motor 203A is on the vibrated side with respect to the first motor 203A on the vibrated side and the directional relationship is generated. Similarly, a vibration suppression command with a content corresponding to a shaft combination in which the second motor 203B is on the vibrating side and the third motor 203C is on the vibrated side with respect to the third motor 203C on the vibrated side and the directional relationship is generated. For this reason, the controller 201 stores the waveform parameters and the number of offset cycles for each of all the number of shaft combinations and the number of directional relationships (in this example, 3 combinations×2 directions=6 types) that form a pair in a plurality of drive shaft control systems and generates the vibration suppression command with the corresponding contents.

When the two drive shaft control systems are on the vibrating side at short time intervals, the vibration suppression command corresponding to the superimposed waveforms is generated on the other vibrated side. When the servo amplifiers 202A and 202C generate the torque feedforward command, the controller 201 generates a vibration suppression command that combines information on which drive shaft control system is on the vibrating side and the magnitude of the jerk and outputs the vibration suppression command to the servo amplifiers 202A and 202B. Although not particularly illustrated, the same vibration suppression method can be applied even when a drive shaft control system having four or more shafts is provided.

10. Exemplary Hardware Configuration of Controller

Next, an example of a hardware configuration of the controller 1,201 that realizes processing by the program executed by the CPU 901 described above will be described with reference to FIG. 12. The servo amplifiers 2A, 2B, 202A, 202B, and 202C may have the same hardware configuration.

Figure 12:
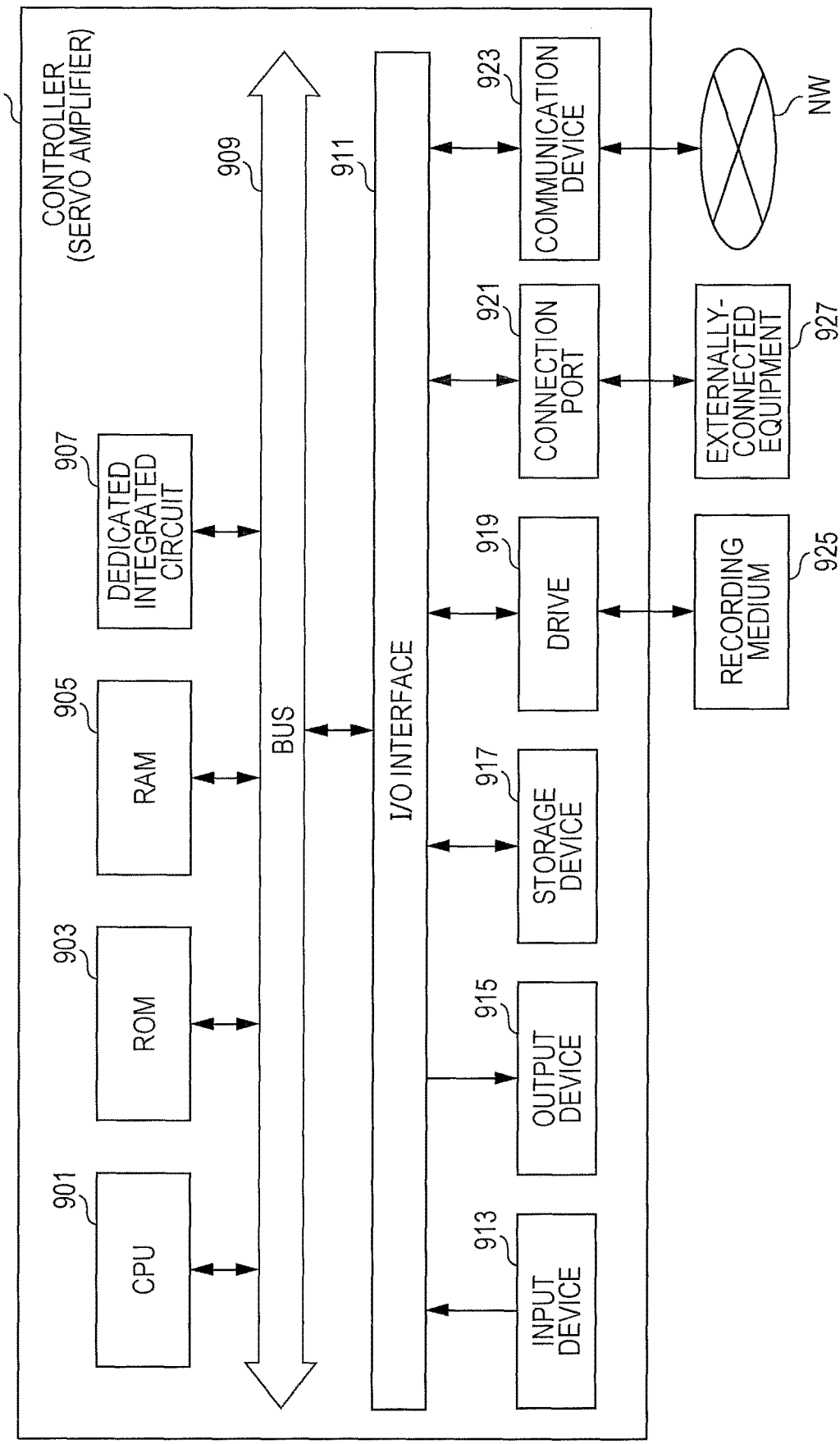
FIG. 12 is a block diagram showing an example of a hardware configuration of a controller.

As shown in FIG. 12, the controller 1,201 (servo amplifier 2,202) has, for example, a CPU 901, a ROM 903, a RAM 905, a dedicated integrated circuit 907 constructed for specific use such as an ASIC or an FPGA, an input device 913, an output device 915, a storage device 917, a drive 919, a connection port 921, and a communication device 923. These constituent elements are mutually connected via a bus 909 and an I/O interface 911 such that signals can be transferred.

The program can be recorded in the ROM 903, the RAM 905, and the storage device 917, for example.

The program can also temporarily or permanently (non-temporarily) be recorded in a removable recording medium 925 such as magnetic disks including flexible disks, various optical disks including CDs, MO disks, and DVDs, and semiconductor memories. The recording medium 925 as described above can be provided as so-called packaged software. In this case, the program recorded in the recording medium 925 may be read by the drive 919 and recorded in the storage device 917 through the I/O interface 911, the bus 909, etc.

The program may be recorded in, for example, a download site, another computer, or another storage device (not shown). In this case, the program is transferred through a network NW such as a LAN and the Internet, and the communication device 923 receives this program. The program received by the communication device 923 may be recorded in the storage device 917 through the I/O interface 911, the bus 909, etc.

The program may be recorded in appropriate externally-connected equipment 927, for example. In this case, the program may be transferred through the appropriate connection port 921 and recorded in the storage device 917 through the I/O interface 911, the bus 909, etc.

Then, the CPU 901 executes various processing in accordance with the program recorded in the storage device 917 to implement control processing by the controller 1,201 (or servo amplifier 2,202) described above. In this case, for example, the CPU 901 may directly read and execute the program from the storage device 917 or may execute the program once loaded in the RAM 905. In the case where the CPU 901 receives the program through, for example, the communication device 923, the drive 919, or the connection port 921, the CPU 901 may directly execute the received program without recording in the storage device 917.

The CPU 901 may execute various processing based on a signal or information input from the input device 913 such as a mouse, a keyboard, and a microphone (not shown) as needed.

Then, the CPU 901 outputs the result of executing the above processing from the output device 915 such as a display device or an audio output device. Furthermore, the CPU 901 may transmit the processing result via the communication device 923 or the connection port 921 as necessary, or may record the processing result in the storage device 917 or the recording medium 925.

If terms "vertical," "parallel," "plane," etc. are used in the above description, these terms are not used in the exact meanings thereof. Specifically, these terms "vertical," "parallel," and "plane" allow tolerances and errors in design and producing and have meanings of "approximately vertical," "approximately parallel," and "approximately plane."

If terms "same," "equal," "different," etc. in relation to a dimension and a size of the appearance, a shape, a position, etc. are used in the above description, these terms are not used in the exact meaning thereof. Specifically, these terms "same," "equal," and "different" allow tolerances and errors in design and producing and have meanings of "approximately the same," "approximately equal," and "approximately different."

The present invention is not limited to the above-described embodiments. Within the scope of the present invention, the above-described embodiments can be freely combined, as well as any components in the embodiments can be modified or omitted.

What is claimed is:

1. A machine control system comprising:
a first movable element configured to be driven by a first motor;
a second movable element configured to be driven by a second motor which is connected to the first motor so that a jerk to be generated by the first motor is applied to the second movable element; and
control circuitry configured to generate a first control command to control the first motor and to generate a second control command to control the second motor according to the jerk to be generated by the first motor so as to suppress a vibration to be applied to the second movable element due to the jerk to be generated.

2. The machine control system according to claim 1, wherein the control circuitry is configured to generate the second control command in which a vibration suppression command generated based on the jerk is added to a normal control command to control the second motor.

3. The machine control system according to claim 2, wherein
the control circuitry includes first circuitry configured control the first motor, second circuitry configured control the second motor, and host circuitry configured to generate the first control command and the second control command,
the second circuitry is configured to add, as a torque feedforward command, the vibration suppression command in the second control command to a torque command of normal control to control the second motor, and
the host circuitry is configured to generate the torque feedforward command based on the jerk.

4. The machine control system according to claim 3, wherein the vibration suppression command is generated in time series with a value sampled at a communication control cycle between the host circuitry and the first and second circuitry.

5. The machine control system according to claim 4, wherein the vibration suppression command is output at a cycle period offset by a predetermined number of cycles from a generation cycle period of the jerk in the communication control cycle.

6. The machine control system according to claim 3, wherein the first circuitry, the second circuitry, and the host circuitry are discrete.

7. The machine control system according to claim 2, wherein the vibration suppression command is generated with an anti-phase waveform of a vibration waveform generated in the movable element by the jerk.

8. The machine control system according to claim 7, wherein the anti-phase waveform is generated with a substantially sinusoidal waveform defined by a waveform parameter of at least one of an amplitude ratio with respect to the jerk, a frequency, and an output cycle.

9. The machine control system according to claim 7, wherein the vibration suppression command is generated with a superimposed waveform of the anti-phase waveform respectively corresponding to a predetermined number of jerks generated in the immediately past.

10. The machine control system according to claim 2, wherein the vibration suppression command is generated corresponding to the jerk that is equal to or greater than a predetermined threshold.

11. A machine controller comprising:
control circuitry configured to generate a second control command to control the second motor according to a jerk to be generated by a first motor and to be applied to the second motor,
wherein the control circuitry is configured to generate the second control command in which a vibration suppression command generated based on the jerk is added to a normal control command to control the second motor.

12. A machine controller according to claim 11, wherein the vibration suppression command is generated with an anti-phase waveform of a vibration waveform generated in the movable element by the jerk.

13. A machine controller according to claim 11, wherein the vibration suppression command is generated corresponding to the jerk that is equal to or greater than a predetermined threshold.

14. A machine control system comprising:
a first movable element configured to be driven by a first motor;
a second movable element configured to be driven by a second motor which is connected to the first motor so that a jerk to be generated by the first motor is applied to the second movable element; and
control circuitry configured to generate a first control command to control the first motor and to generate a second control command to control the second motor according to the jerk,
wherein the control circuitry is configured to generate the second control command in which a vibration suppression command generated based on the jerk is added to a normal control command to control the second motor.

15. The machine control system according to claim 14, wherein
the control circuitry includes first circuitry configured control the first motor, second circuitry configured control the second motor, and host circuitry configured to generate the first control command and the second control command,
the second circuitry is configured to add, as a torque feedforward command, the vibration suppression command in the second control command to a torque command of normal control to control the second motor, and
the host circuitry is configured to generate the torque feedforward command based on the jerk.

16. The machine control system according to claim 14, wherein the vibration suppression command is generated with an anti-phase waveform of a vibration waveform generated in the movable element by the jerk.

17. The machine control system according to claim 14, wherein the vibration suppression command is generated corresponding to the jerk that is equal to or greater than a predetermined threshold.

* * * * *